United States Patent
Watanabe et al.

(10) Patent No.: US 8,964,324 B1
(45) Date of Patent: Feb. 24, 2015

(54) MAGNETIC HEAD HAVING IMPROVED CLEARANCE CONTROL

(71) Applicant: HGST Netherlands B.V., Amsterdam (NL)

(72) Inventors: Kouichi Watanabe, Ashigarakamigun (JP); Hideaki Tanaka, Odawara (JP); Yoshinori Takeuchi, Ishioka (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/278,946

(22) Filed: May 15, 2014

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 7,239,471 B2 | 7/2007 | Tanabe | |
| 8,149,541 B2 | 4/2012 | Baumgart et al. | |
| 8,335,053 B2 | 12/2012 | Chen et al. | |
| 2008/0225430 A1 | 9/2008 | Kawamoto et al. | |
| 2009/0262460 A1* | 10/2009 | Hanchi et al. | 360/235.4 |
| 2011/0157736 A1 | 6/2011 | Contreras et al. | |
| 2011/0235208 A1 | 9/2011 | Yang | |
| 2012/0099218 A1* | 4/2012 | Kurita et al. | 360/59 |
| 2012/0120521 A1 | 5/2012 | Kurita et al. | |
| 2012/0120528 A1 | 5/2012 | Furukawa et al. | |
| 2012/0262816 A1* | 10/2012 | Tanaka et al. | 360/59 |
| 2013/0083430 A1 | 4/2013 | Chiu et al. | |
| 2013/0170068 A1 | 7/2013 | Natori | |
| 2014/0177090 A1* | 6/2014 | Contreras et al. | 360/75 |

FOREIGN PATENT DOCUMENTS

EP 2595154 A1 5/2013

OTHER PUBLICATIONS

Xu, J. et al.; "Drive Level Measurement of Flying Height Modulation and Control of Slider Disk Contact"; Tribology Letters; vol. 24, Issue 2; Nov. 2006.

* cited by examiner

*Primary Examiner* — Andrew L Sniezek
(74) *Attorney, Agent, or Firm* — Patterson & Sheridan, LLP (57) ABSTRACT

The present disclosure generally relates to clearance control between a magnetic head and a recording medium in a magnetic disk device. A magnetic head comprises an embedded contact sensor, a thermal flying height control element, and a hard disk drive controller. The hard disk drive controller is adapted to control a detection current of the embedded contact sensor and a power applied to the thermal flying height control. The detection current supplied to the embedded contact sensor is optimized so that a change in resistance of the embedded contact sensor is less sensitive relative to the power applied to the thermal flying height control. The resistance of the embedded contact sensor remains unchanged when the power applied to the thermal flying height control is changed to adjust for changes in the clearance. Thus, clearance changes can be detected by monitoring changes in the resistance of the embedded contact sensor.

20 Claims, 7 Drawing Sheets

MAGNETIC HEAD HAVING IMPROVED CLEARANCE CONTROL

BACKGROUND OF THE INVENTION

1. Field of the Invention

Embodiments disclosed herein generally relate to clearance control between a magnetic head and a recording medium in a magnetic disk device.

2. Description of the Related Art

The recording density of a magnetic disk device can be improved to the extent that the clearance between the magnetic head and the recording medium is reduced. Lower clearances between magnetic heads and recording media have been introduced as a result of higher recording densities in disk devices. For example, clearance adjustment can be performed in which thermal deformation is used by a thermal flying height control (TFC) actuator mounted in a magnetic head in order to reduce the clearance between a magnetic head and a recording medium.

However, structural errors occur in each magnetic head, including errors in machining the shape of a magnetic slider and errors in assembling the suspension for magnetic heads. These errors cause variations in the clearance of magnetic heads. It is essential at high recording densities to minimize these variations and keep the clearance within a predetermined range.

When a magnetic disk device is manufactured, clearance adjustments are made using an embedded contact sensor (ECS) to keep the clearance within a predetermined range. An ECS is configured using metal film and the electrical resistance changes due to frictional heating when the magnetic head and the recording medium are in contact. This change is detected using a predetermined detection current flowing to the ECS. In the clearance adjustment process, power is applied to the TFC in stages. First, contact between the magnetic head and the recording medium, oftentimes referred to as 'touchdown', is detected by the ECS, and in response, the TFC power is subtracted in accordance with the indicated clearance. The TFC power to be applied is then determined so the clearance adjustment arrives at the predetermined optimal clearance.

However, some of the clearance between the magnetic head and the recording medium is caused by environmental factors such as the ambient temperature and atmospheric pressure at which the magnetic disk is being used, and external factors such as contaminants. In a worst case scenario, when read/write performance has deteriorated, physical crashing of the recording medium (i.e., touchdown) may occur due to contact, and the reliability of the disk drive may decline significantly.

Therefore, controls are required to keep the clearance within the predetermined range even when some of these external factors have occurred and the clearance between the magnetic head and the recording medium has changed.

SUMMARY OF THE INVENTION

The present disclosure generally relates to clearance control between a magnetic head and a recording medium in a magnetic disk device. A magnetic head comprises an embedded contact sensor, a thermal flying height control element, and a hard disk drive controller. The hard disk drive controller is adapted to control a detection current of the embedded contact sensor and a power applied to the thermal flying height control. The detection current supplied to the embedded contact sensor is optimized so that a change in resistance of the embedded contact sensor is less sensitive relative to the power applied to the thermal flying height control. The resistance of the embedded contact sensor remains unchanged when the power applied to the thermal flying height control is changed to adjust for changes in the clearance. Thus, clearance changes can be detected by monitoring changes in the resistance of the embedded contact sensor.

In one embodiment, a magnetic media device comprises a magnetic head having an embedded contact sensor configured to detect contact between the magnetic head and a magnetic recording medium, a thermal flying height control element adapted to adjust a clearance between the magnetic recording medium and the magnetic head, and a magnetic media controller coupled to the magnetic head and the thermal flying height control element. The magnetic media controller is adapted to adjust the clearance between the magnetic recording medium and the magnetic head, and to control a detection current of the embedded contact sensor. The embedded contact sensor detection current is adjusted to maintain a substantially constant embedded contact sensor resistance in response to an adjustment of power applied to thermal flying height control element using a calibration table.

In another embodiment, a magnetic media device comprises a magnetic head having an embedded contact sensor configured to detect contact between the magnetic head and a magnetic recording medium, a thermal flying height control element adapted to adjust a clearance between the magnetic recording medium and the magnetic head, and means for adjusting the clearance between the recording medium and the magnetic head, to control a detection current of the embedded contact sensor, to adjust a detection current of the embedded contact sensor, to maintain a substantially constant embedded contact sensor resistance in response to an adjustment of power applied to the thermal flying height control element and to adjust the embedded contact sensor detection current relative to the power applied to the thermal flying height control element using a calibration table.

In another embodiment, a hard disk drive comprises one or more magnetic disks, an actuator, one or more actuator arms associated with each of the magnetic disks, a slider, a spindle, and a magnetic head. The magnetic head further comprises an embedded contact sensor configured to detect contact between the magnetic head and a magnetic recording medium, a thermal flying height control element adapted to adjust a clearance between the magnetic recording medium and the magnetic head, and a hard disk drive controller coupled to the magnetic head and the thermal flying height control element. The hard disk drive controller is adapted to adjust the clearance between the magnetic recording medium and the magnetic head, and to control a detection current of the embedded contact sensor. The embedded contact sensor detection current is adjusted to maintain a substantially constant embedded contact sensor resistance in response to an adjustment of power applied to thermal flying height control element using a calibration table.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a schematic diagram showing contact between the magnetic head and the recording medium.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure generally relates to clearance control between a magnetic head and a recording medium in a magnetic disk device. A magnetic head comprises an embedded contact sensor, a thermal flying height control element, and a hard disk drive controller. The hard disk drive controller is adapted to control a detection current of the embedded contact sensor and a power applied to the thermal flying height control. The detection current supplied to the embedded contact sensor is optimized so that a change in resistance of the embedded contact sensor is less sensitive relative to the power applied to the thermal flying height control. The resistance of the embedded contact sensor remains unchanged when the power applied to the thermal flying height control is changed to adjust for changes in the clearance. Thus, clearance changes can be detected by monitoring changes in the resistance of the embedded contact sensor.

In order to address the problems discussed above, a method has been provided to monitor the clearance using the so-called "cooling effect" in which heat caused by the TFC escapes from the surface of the magnetic head towards the recording medium when the magnetic head and the recording medium approach each other.

Figure 1:
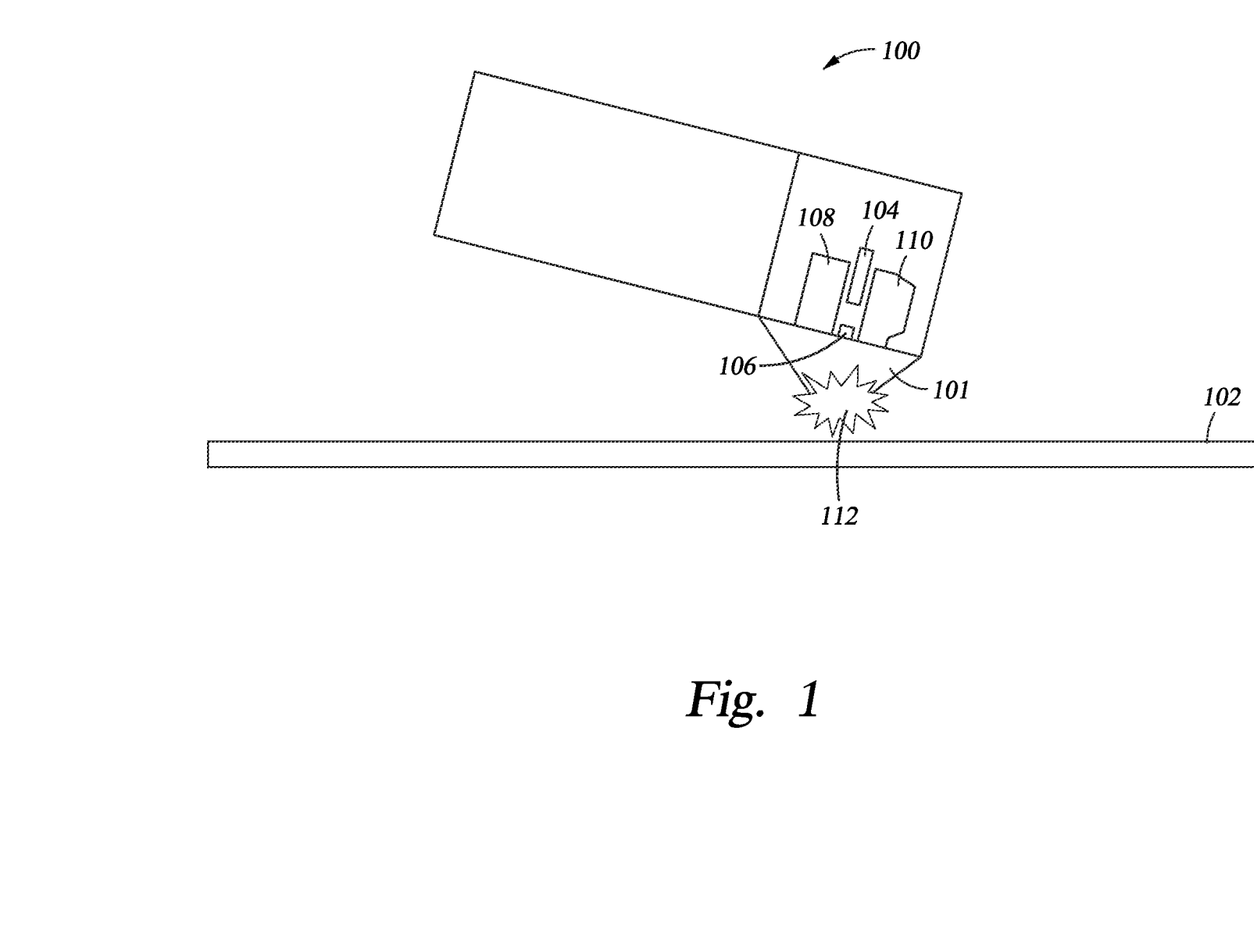
Figure 2:
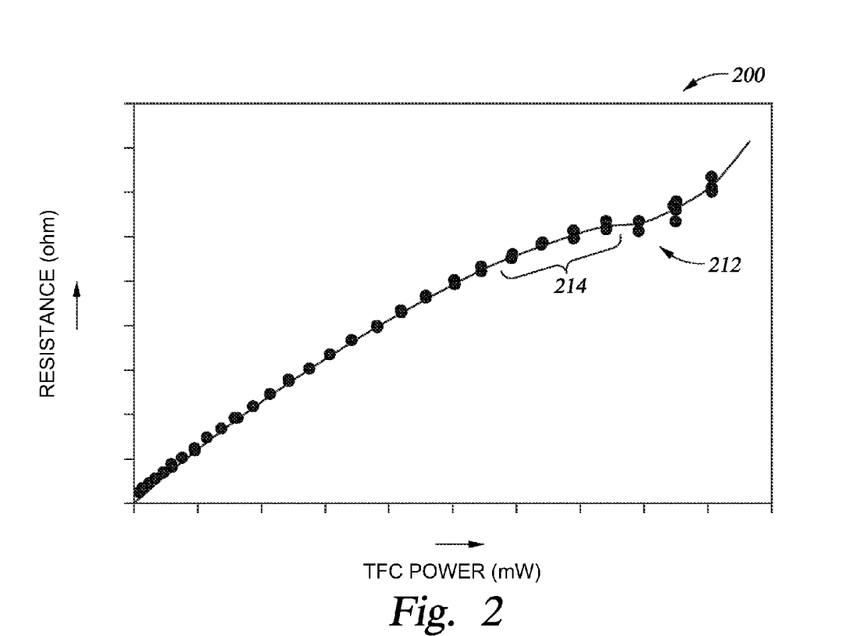
FIG. 2 shows the relationship between the power applied to the TFC and the change in ECS resistance.

FIG. 1 is a schematic diagram showing contact between a magnetic head 100 and a recording medium 102 when power has been applied to a TFC 104. The magnetic head 100 includes an ECS 106, a reader 108, and a writer 110. A touchdown 112 between a magnetic head protrusion 101 and the recording medium 102 is illustrated. FIG. 2 illustrates a graph 200 showing a relationship between the power applied to the TFC 104 and the change in the resistance of the ECS 106 until the magnetic head 100 and the recording medium 102 come into contact, as shown in FIG. 1. In the graph 200 of FIG. 2, there is an almost linear increase in the resistance of the ECS 106 due to heat caused by the TFC 104 as the power applied to the TFC 104 is increased in stages. In the low clearance range 214 immediately before touchdown 212 of the magnetic head 100 on the recording medium 102, the resistance of the ECS 106 declines slightly relative to the increase in power applied to the TFC 104. This change is caused by the cooling effect as heat from the surface of the magnetic head 100 escapes towards the recording medium 102 as the magnetic head 100 is approaching the recording medium 102. Afterwards, as the power applied to the TFC 104 increases further, the magnetic head 100 and the recording medium 102 make contact 212, and the resistance of the ECS 106 increases due to friction heating.

Figure 3:
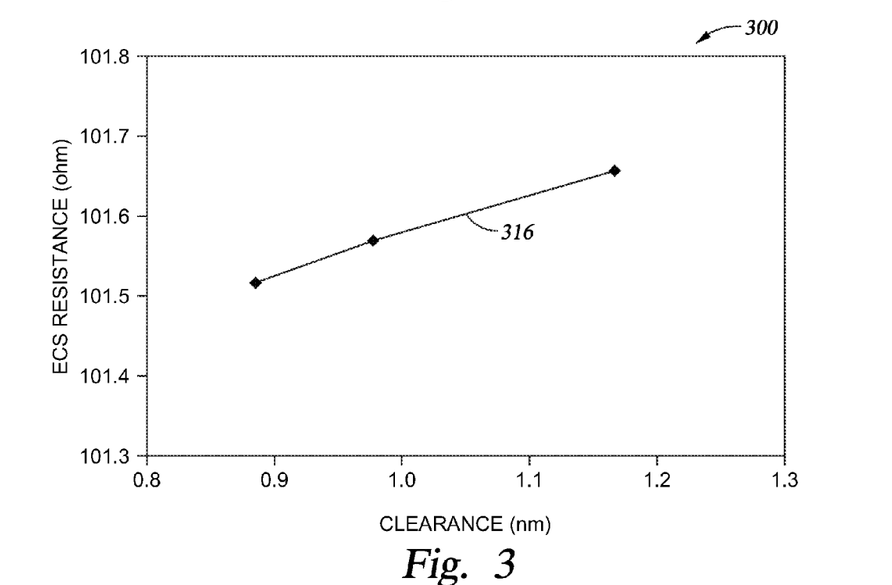
FIG. 3 shows the relationship between the clearance and the ECS resistance.

FIG. 3 is a graph 300 showing the relationship between the clearance and the resistance of the ECS 106 when the magnetic head 100 and recording medium 102 are very close to making contact. The range of optimum clearance adjustment corresponds exactly with the low clearance range 214 of FIG. 2 in which the cooling effect is observed. However, in this range 214, there is also a correlation 316 between the clearance and the resistance of the ECS 106. Especially high correlativity 316 is observed at an approximate clearance of 1 nm. Therefore, it can be said that the clearance can be detected by measuring the resistance of the ECS 106 in this low clearance range 214.

The TFC technique is applied to a magnetic disk drive as a method of bringing the magnetic head 100 closer to the recording medium 102. The TFC 104 is configured from a heating element, and power is applied to cause the protrusion of the magnetic head 101 to protrude towards and approach the recording medium 102.

The clearance between the magnetic head 100 and the recording medium 102 is controlled by activating and initializing the TFC 104 with the magnetic head 100 in contact with the recording medium 102. The ECS 106 is used to detect the contact state with great precision.

However, because the ECS 106 is a resistive element, and because the heat from the TFC 104 used to adjust the clearance interacts in complex ways with the rise in temperature caused by the friction heating and the cooling effect, there are problems with obtaining precise detection when an ECS 106 is used as the clearance monitor.

The magnetic head structure 100 of FIG. 1 is used throughout to describe the embodiments below, and is used in conjunction with a hard disk drive. While the description is made with reference to a hard disk drive, it is to be understood that the embodiments herein are envisioned to be used with other recording systems, such as tape drives and hybrid drives. Therefore, the invention is not to be limited to hard disk drives. The hard disk drive also comprises one or more magnetic disks, an actuator, one or more actuator arms associated with each of the magnetic disks, a slider, a spindle, and the magnetic head.

Figure 4:
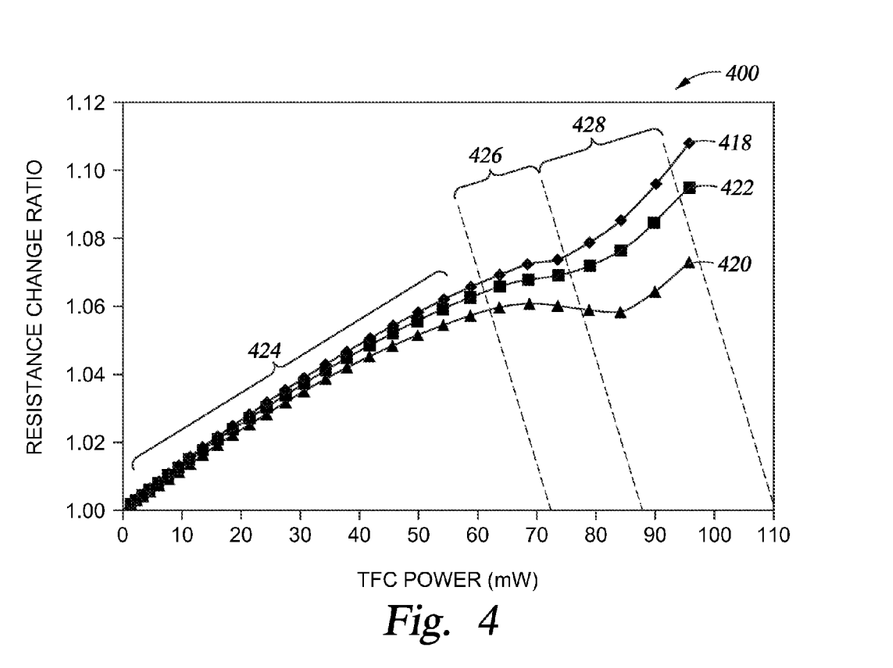
FIG. 4 shows the relationship between the power applied to the TFC and the ECS resistance change ratio.

FIG. 4 illustrates a graph 400 which shows the relationship between the power applied to the TFC 104 and the resistance change ratio of the ECS 106 with an initial ratio value of 1.0. The graph 400 indicates the differences for three types of detection currents provided to the ECS 106. Line 418 is for conditions in which the detection current is relatively low, for example 1.2 mA, line 420 is for conditions in which the detection current is relatively high, for example 3.2 mA, and line 422 is for conditions in which the detection current is intermediate, for example 2.2 mA. When power is applied to the TFC 104, the increase in the resistance of the ECS 106 is somewhat linear relative to the rise in the temperature of the TFC 104, as seen by region 424. Afterwards in region 426, when the magnetic head 100 and the recording medium 102 come very close to each other, the rise in the resistance of the ECS 106 is suppressed because heat generated by the TFC 104 on the surface of the magnetic head 100 escapes towards the recording medium 102. As the magnetic head 100 and recording medium 102 get even closer and come into contact in region 428, around a TFC 104 power of 80 mW, the heat caused by friction with the recording medium 102 causes the resistance of the ECS 106 to rise again. Generally, contact detection involves detecting the rise in resistance of the ECS 106 due to this frictional heating.

When the detection current of the ECS 106 supplied is high, as shown by line 420, the heat generated by the ECS 106 itself increases, and a phenomenon occurs in which this heat escapes to the recording medium 102. In response to this phenomenon, the change in the resistance of the ECS 106 is able to be made less sensitive to the power applied to the TFC 104. The power applied to the TFC 104 is different at inner and outer circumferential positions on the recording medium 102, and the power applied to the TFC 104 is different even when the intention is to realize the same clearance. By using inner and outer circumferential positions on the recording medium 102 with different detection currents, the resistance of the ECS 106 can change to be less sensitive to the power applied to the TFC 104. Thus, high-precision clearance monitoring is possible in which there is no adverse effect from the heat caused by the application of power to the TFC 104.

In order to effectively exhibit this function over the entire surface of the recording medium 102, a calibration table of the TFC/ECS relationship is preferably created beforehand using a learning function. The detection currents of the ECS 106 are established for the powers applied to the TFC 104 and put into the same table, and a function for performing constant monitoring of the ECS 106 is provided so that the same clearance can be maintained over the entire recording medium 102. The relationship between the detection current supplied to the ECS 106 and the power applied to the TFC 104 is controlled in stages using the calibration table. Any change in temperature caused by the TFC 104 does not adversely affect the detection precision of the ECS 106 because the detection current supplied to the ECS 106 is set to a range in which there is very little change in the resistance of the ECS 106 relative to the power applied to the TFC 104.

Figure 5:
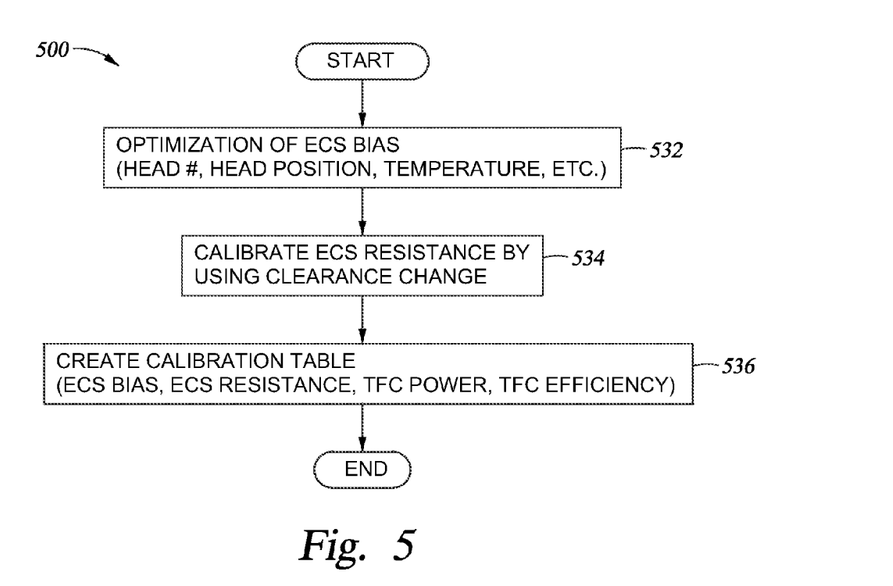
FIG. 5 shows an example process used to create a calibration table.

FIG. 5 shows an example of a process 500 used to create a calibration table, which in one example could be for the magnetic head of FIG. 1. First, in operation 532, the detection current of the ECS 106 is established so that the change in the resistance of the ECS 106 is less sensitive relative to the power applied to the TFC 104 in accordance with each magnetic head 100, the inner and outer circumferential position on the recording medium 102, and environmental conditions such as the ambient temperature around the magnetic disk device. In this way, the resistance of the ECS 106 can be set under each condition so that it is not adversely affected by the power applied to the TFC 104. In operation 534, calibration of the resistances and clearances of the ECS 106 is performed. Calibration of the resistances and clearances of the ECS 106 can be easily performed at this time even when minute changes in the clearance are employed in the circumferential direction of the recording medium 102. Lastly, in operation 536, the calibration table 530 is formed using the gathered data.

Figure 6:
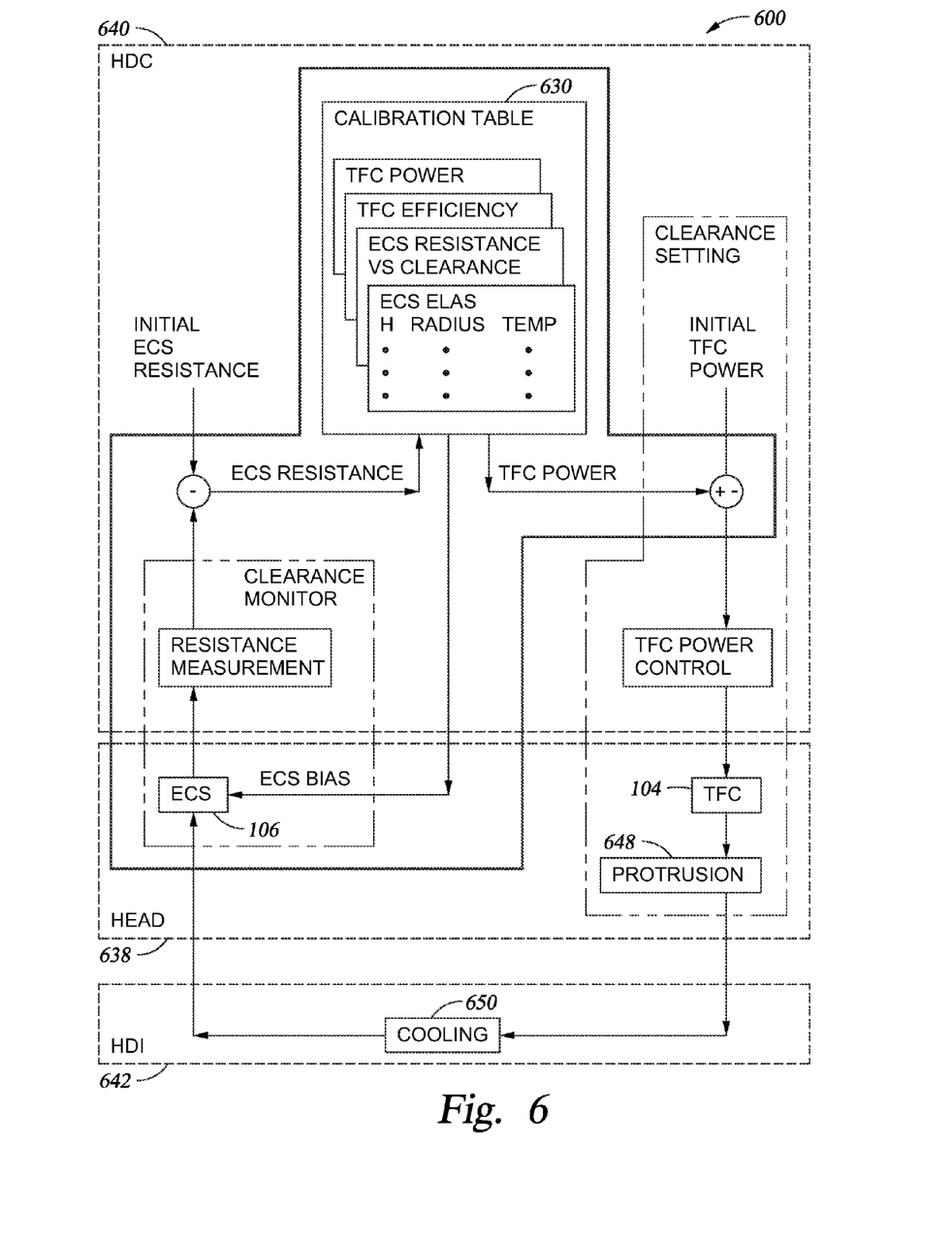
FIG. 6 shows a diagram of a magnetic disk device according to the present invention.

FIG. 6 is a block diagram of a magnetic disk device 600 according to one embodiment. The magnetic disk device 600 is configured using a magnetic head 638 incorporating TFC/ECS, and the main components of a hard disk drive controller (HDC) 640 used to control the recording medium 642 and its constituent components. The power applied 644 to the TFC 604 and the detection current of the ECS 606 are controlled by instructions from the HDC 640. The HDC 640 is adapted to change the detection current supplied to the ECS 106 in accordance with the power applied 644 to the TFC 104, and the detection current supplied to the ECS 106 is adjusted to maintain a substantially constant resistance of the ECS 106. A calibration table 630 is prepared for the HDC 640 beforehand using a learning function, and this table 630 may include: power applied 644 to the TFC 104, ECS 106 detection currents, ECS 106 resistances and clearances for each magnetic head 638, position on the recording medium 642, and environmental factors such as temperature.

In the magnetic disk device 600 of FIG. 6, the resistance of the ECS 106 is monitored constantly during operation and compared to the initial resistance of the ECS 106 to monitor clearance changes. The HDC 640 is adapted to measure the resistance of the ECS 106 and to adjust a ratio between the ECS 106 detection current and the power applied 644 to the TFC 104 using the calibration table 630. The power applied 644 to the TFC 104 causes the magnetic head 638 to protrude 648 towards the magnetic medium at the optimal clearance level. The cooling effect 650 may alter the clearance of the magnetic head 638 on the magnetic medium 642. To determine if the clearance has changed, the resistance of the ECS 106 is measured again. When a change is observed in the resistance of the ECS 106, feedback is given for the voltage applied to the TFC 104 based on the calibration table 630 in order to make target clearance adjustments. The clearance is then adjusted by adjusting the power 644 to the TFC 104. The clearance is typically maintained within 1 nanometer of a predetermined range.

Figure 7:
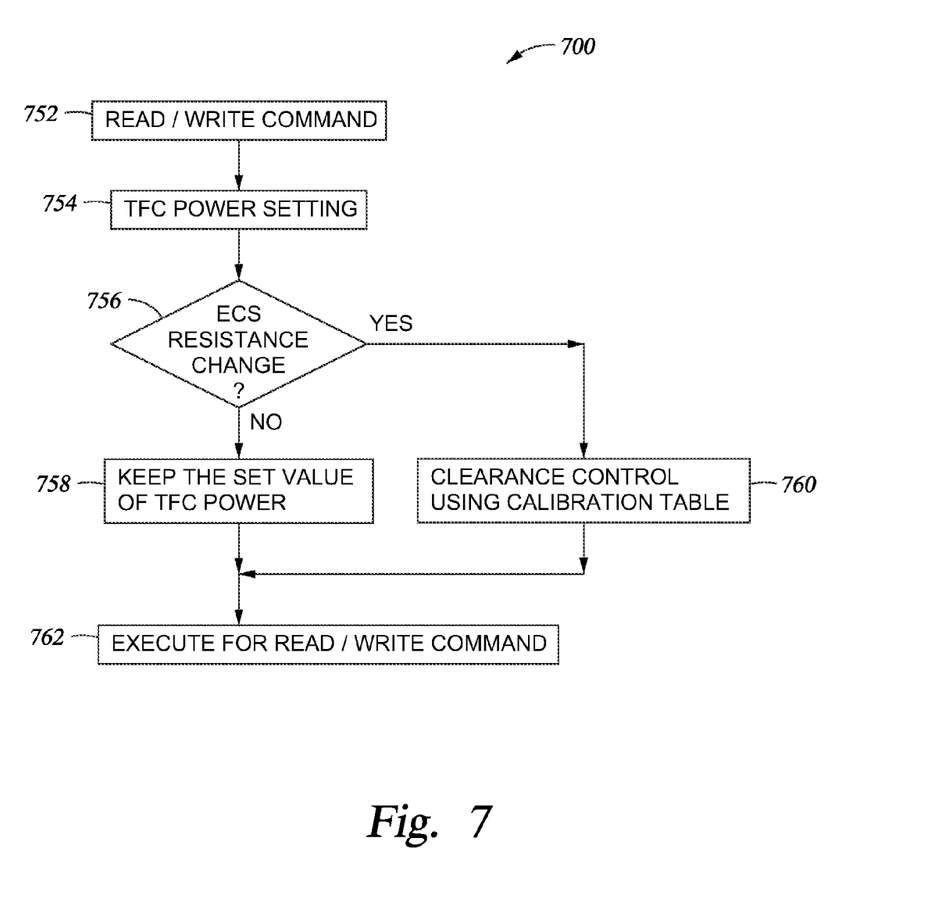
FIG. 7 shows the operating steps of the magnetic disk device.

FIG. 7 illustrates a flow diagram 700 showing the operating steps of the magnetic disk device according to one embodiment. In one example, the operation of flow diagram 700 may be used in conjunction with the magnetic head of FIG. 1 or the magnetic disk device of FIG. 6. The flow diagram 700 begins at operation 752, in which instructions are received to have the magnetic head 100 perform a read/write operation on the recording medium 102. In operation 754, the initially established TFC 104 power is first applied. Then, in operation 756, the resistance of the ECS 106 is measured under the current conditions and compared to the calibration table 630. If there has been no change in the resistance of the ECS 106, application of the initially established TFC 104 power is maintained as operation 758. If there has been a change in resistance of the ECS 106, it is determined that a clearance change has occurred. If the resistance of the ECS 106 has changed, operation 760 adjusts the power applied to the TFC 104 in accordance with the calibration table 630, achieving the target value for the clearance, and a read/write operation 762 is performed on the recording medium 102. If it is determined the resistance of the ECS 106 remained unchanged in operation 758, the HDC 640 is adapted to maintain the power applied to the TFC 104 at a substantially constant level, and the read/write operation 762 is performed on the recording medium 102.

Figure 8A:
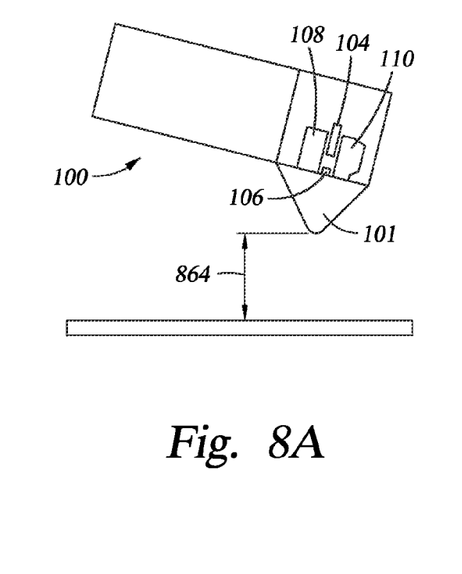
FIGS. 8A-C show a schematic diagram in which the clearance between the magnetic head and recording medium has changed.
Figure 8B:
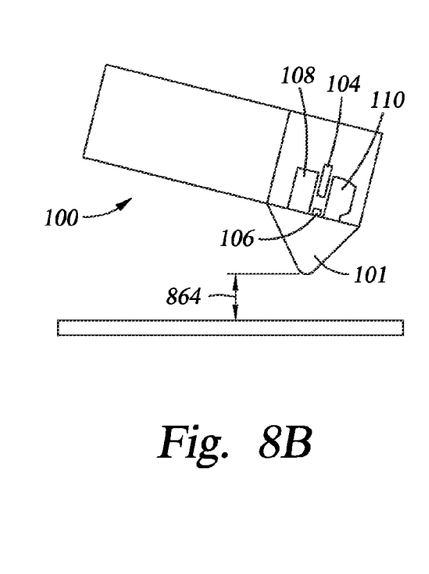
Figure 8C:
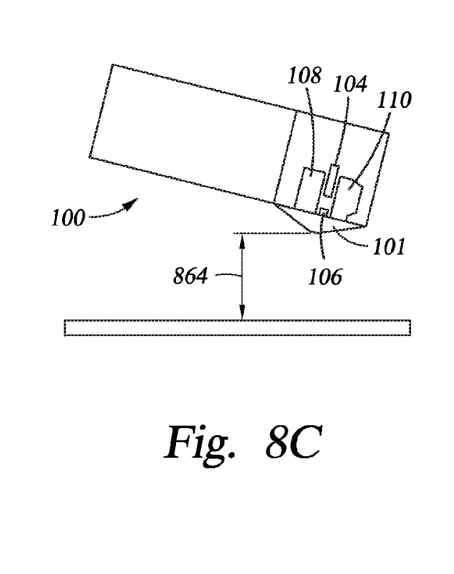

FIGS. 8A-8C illustrate the magnetic head 100 of FIG. 1 during operation. Specifically, a situation is shown in which a clearance 864 between a magnetic head 100 and a recording medium 102 has changed due to external factors, such as changes in the ambient temperature and atmospheric pressure, and the clearance 864 is adjusted accordingly. In FIG. 8A, the magnetic head 100 is at an optimal target clearance 864, and the initial resistance of the ECS 106 and the initial power applied to the TFC 104 have been measured. In FIG. 8B, the operation process of FIG. 7 has been utilized, and it has been determined the resistance of the ECS 106 has changed, and thus, the clearance 864 has changed due to external factors. In FIG. 8C, the clearance adjustment is made in accordance with the previously constructed calibration table 630, the magnetic head protrusion 101 has decreased to account for the clearance adjustment, and the clearance 864 is maintained within a predetermined range based on the calibration table 630. An HDC is adapted to apply power to the TFC 104 to cause the protrusion of the magnetic head 101 to vary as required to maintain the optimal clearance 864.

Figure 9:
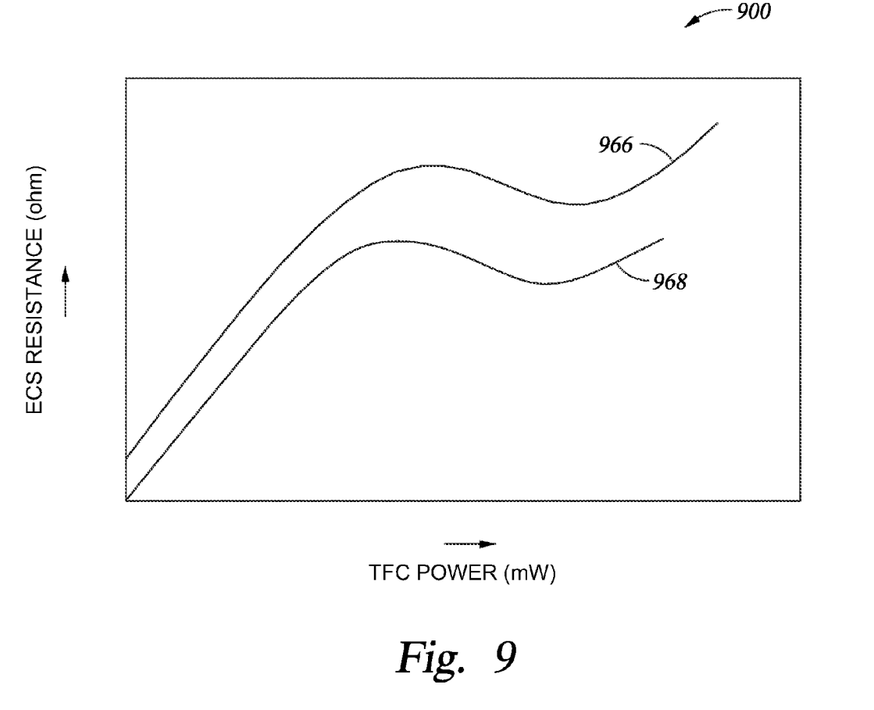
FIG. 9 shows the relationship between the ECS resistance changes and the power applied to the TFC.

FIG. 9 is a graph 900 which shows the relationship between changes in the resistance of the ECS 106 and the power applied to the TFC 104 when a clearance change has been adjusted using an operation and device of a previous embodiment, such as FIG. 1 and FIG. 7. Here, the detection current supplied to the ECS 106 is optimized so that the change in the resistance of the ECS 106 is less sensitive to the power applied to the TFC 104. Line 966 shows the change in the resistance of the ECS 106 at the initial setting of the clearance between the magnetic head 100 and the recording medium 102, and line 968 shows the change in the resistance of the ECS 106 when power is applied to the TFC 104 after the clearance has been changed by external factors. When the resistance of the ECS 106 is constantly monitored and a change has occurred in the resistance of the ECS 106 from line 966 to line 968 in FIG. 9, it is determined a change has occurred in the clearance. The power applied to the TFC 104 is adjusted in accordance with the amount of change in the clearance on the basis of the calibration table prepared beforehand, and the clearance is brought in line with the initial setting.

In this method, the detection current supplied to the ECS 106 is optimized so that the change in resistance of the ECS 106 is less sensitive relative to the power applied to the TFC 104. In this way, the resistance of the ECS 106 is not adversely affected and does not change even when the power applied to the TFC 104 has been changed in order to adjust for the amount of change in the clearance. As a result, clearance changes can be detected and the optimum clearance maintained simply by monitoring changes in the resistance of the ECS 106.

While the foregoing is directed to embodiments of the present invention, other and further embodiments of the invention may be devised without departing from the basic scope thereof, and the scope thereof is determined by the claims that follow.

What is claimed is:

1. A magnetic media device, comprising:
  a magnetic head having an embedded contact sensor configured to detect contact between the magnetic head and a magnetic recording medium;
  a thermal flying height control element adapted to adjust a clearance between the magnetic recording medium and the magnetic head; and
  a magnetic media controller coupled to the magnetic head and the thermal flying height control element and adapted to adjust the clearance between the magnetic recording medium and the magnetic head, and to control a detection current of the embedded contact sensor, wherein the embedded contact sensor detection current is adjusted to maintain a substantially constant embedded contact sensor resistance in response to an adjustment of power applied to thermal flying height control element using a calibration table.

2. The magnetic media device of claim 1, wherein the magnetic media controller is adapted to adjust the embedded contact sensor detection current relative to the power applied to the thermal flying height control element.

3. The magnetic media device of claim 2, wherein the clearance is adjusted by adjusting the power to the thermal flying height control element.

4. The magnetic media device of claim 1, wherein the magnetic media controller is adapted to adjust a ratio between the embedded contact sensor detection current and the power applied to the thermal flying height control element using the calibration table.

5. The magnetic media device of claim 1, wherein the clearance is maintained within a predetermined range based on the calibration table.

6. The magnetic media device of claim 5, wherein the clearance is maintained within 1 nanometer of the predetermined range.

7. The magnetic media device of claim 1, wherein the calibration table includes one or more variables selected from the group consisting of: power applied to the thermal flying height control element, embedded contact sensor detection currents, embedded contact sensor resistances and clearances for each magnetic head, position on the recording medium, and environmental factors.

8. The magnetic media device of claim 1, wherein the magnetic media controller is adapted to measure the resistance of embedded contact sensor prior to operation to determine an optimal clearance, and for a comparison thereto while the system is operating.

9. The magnetic media device of claim 1, wherein the magnetic media controller is adapted to maintain the power applied to the thermal flying height control element at a substantially constant level when the resistance of the embedded contact sensor remains the same during operation.

10. The magnetic media device of claim 1, wherein the magnetic media controller is adapted to apply power to the thermal flying height control element to cause a portion of the magnetic head to protrude towards the recording medium.

11. A magnetic media device, comprising:
  a magnetic head having an embedded contact sensor configured to detect contact between the magnetic head and a magnetic recording medium;
  a thermal flying height control element adapted to adjust a clearance between the magnetic recording medium and the magnetic head; and
  means for adjusting the clearance between the recording medium and the magnetic head, to control a detection current of the embedded contact sensor, to adjust a detection current of the embedded contact sensor, to maintain a substantially constant embedded contact sensor resistance in response to an adjustment of power applied to the thermal flying height control element and to adjust the embedded contact sensor detection current relative to the power applied to the thermal flying height control element using a calibration table.

12. The magnetic media device of claim 11, wherein the means for adjusting the clearance between the recording medium and the magnetic head further adjusts the detection current of the embedded contact sensor in response to the power applied to the thermal flying height control element, wherein adjusting the power applied to the thermal flying height control element adjusts the clearance.

13. The magnetic media device of claim 11, wherein the means for adjusting the clearance between the recording medium and the magnetic head further adjusts a ratio between the detection current of the embedded contact sensor and the power applied to the thermal flying height control element by using the calibration table.

14. The magnetic media device of claim 11, wherein the means for adjusting the clearance between the recording medium and the magnetic head further applies power to the thermal flying height control element to cause a portion of the magnetic head to protrude towards the recording medium.

15. The magnetic media device of claim 11, wherein the clearance is maintained within a predetermined range based on the calibration table.

16. The magnetic media device of claim 11, wherein the calibration table includes one or more variables selected from the group consisting of: power applied to the thermal flying height control element, embedded contact sensor detection currents, embedded contact sensor resistances and clearances for each magnetic head, position on the recording medium, and environmental factors.

17. A hard disk drive, comprising:
one or more magnetic disks;
a magnetic head, comprising:
an embedded contact sensor configured to detect contact between the magnetic head and a magnetic recording medium;
a thermal flying height control element adapted to adjust a clearance between the magnetic recording medium and the magnetic head; and
a hard disk drive controller coupled to the magnetic head and the thermal flying height control element and adapted to adjust the clearance between the magnetic recording medium and the magnetic head, and to control a detection current of the embedded contact sensor, wherein the embedded contact sensor detection current is adjusted to maintain a substantially constant embedded contact sensor resistance in response to an adjustment of power applied to thermal flying height control element using a calibration table.

18. The hard disk drive of claim 17, wherein the hard disk drive controller is adapted to adjust the embedded contact sensor detection current relative to the power applied to the thermal flying height control element, and wherein the clearance is adjusted by adjusting the power to the thermal flying height control element.

19. The hard disk drive of claim 17, wherein the hard disk drive controller is adapted to measure the resistance of embedded contact sensor prior to operation to determine an optimal clearance, and for a comparison thereto while the system is operating.

20. The hard disk drive of claim 17, wherein the hard disk drive controller is adapted to apply power to the thermal flying height control element to cause a portion of the magnetic head to protrude towards the recording medium.

\* \* \* \* \*